June 20, 1972  A. M. KVALHEIM ET AL  3,671,369
UNIVERSAL MOLDING STRIP FOR TRIMMING
Filed May 6, 1970  4 Sheets-Sheet 1
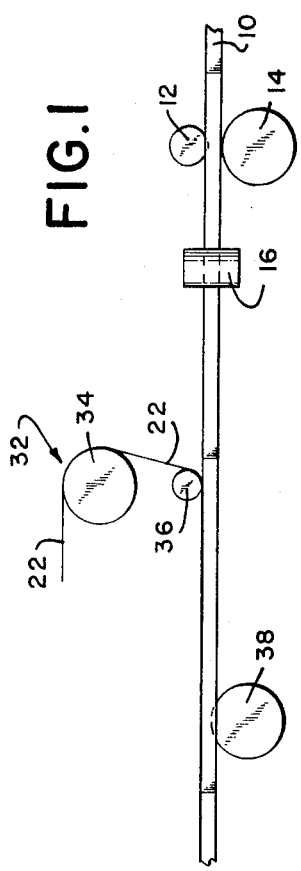
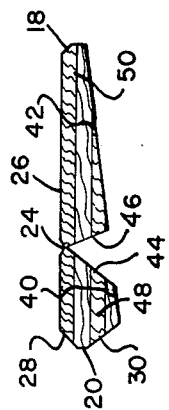
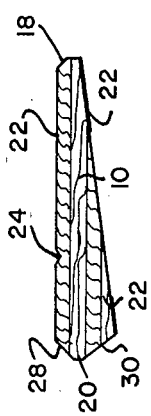
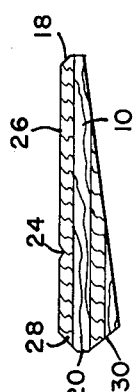
INVENTORS
ANDREW M. KVALHEIM
HOWARD M. WASSEM
BY *Misegades & Douglas*
*Keith Misegades*
ATTORNEYS

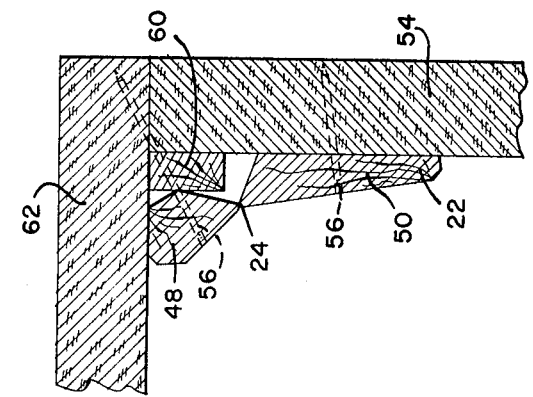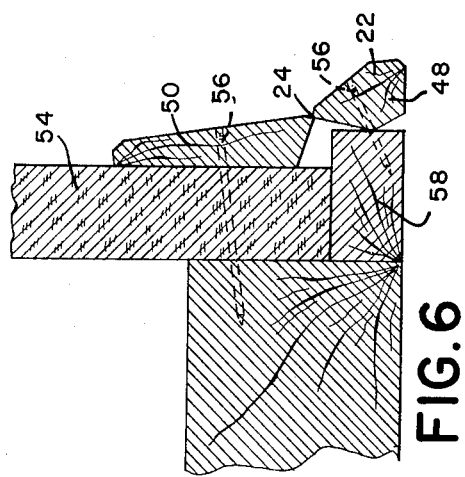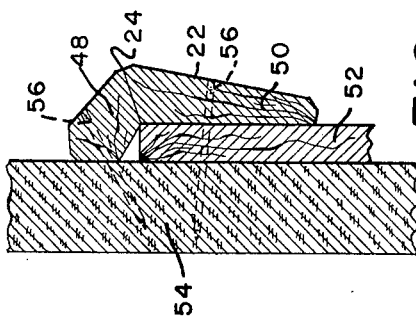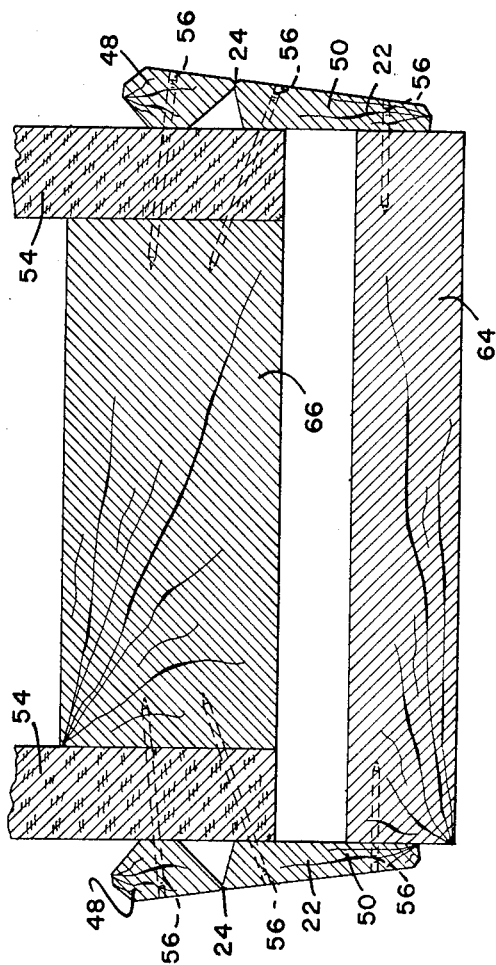

June 20, 1972     A. M. KVALHEIM ET AL     3,671,369
UNIVERSAL MOLDING STRIP FOR TRIMMING Filed May 6, 1970     4 Sheets-Sheet 3

INVENTORS
ANDREW M. KVALHEIM
HOWARD M. WASSEM
BY *Misegades & Douglas*
*Keith Misegades*
ATTORNEYS

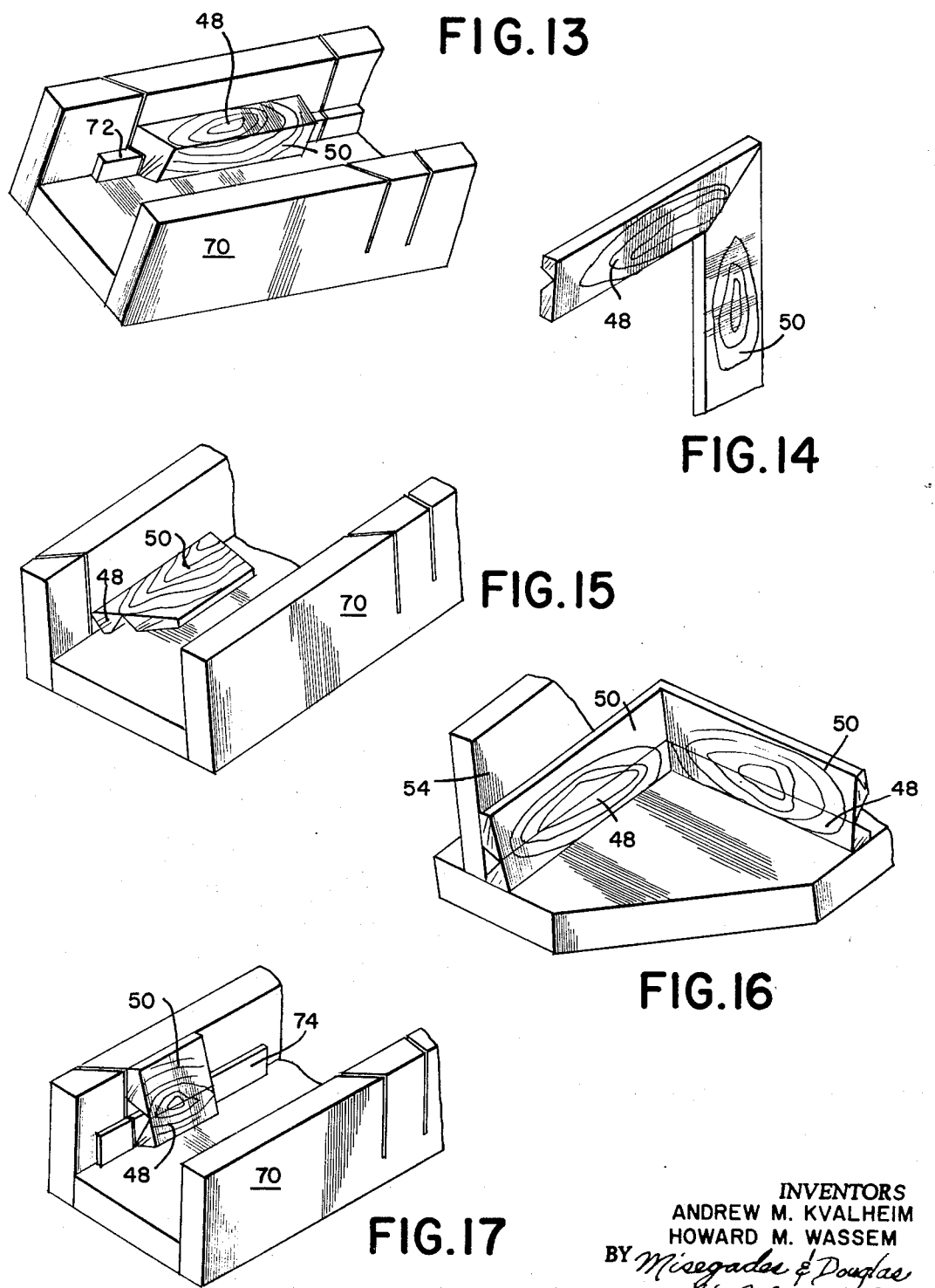

United States Patent Office 3,671,369
Patented June 20, 1972

3,671,369
UNIVERSAL MOLDING STRIP FOR TRIMMING
Andrew M. Kvalheim, Petaluma, and Howard M. Wassem, Rohnert Park, Calif., assignors to Aim Products, Inc., Petaluma, Calif.
Filed May 6, 1970, Ser. No. 35,075
Int. Cl. B32b 3/10; E04c 2/40; E04f 19/02
U.S. Cl. 161—40
5 Claims

ABSTRACT OF THE DISCLOSURE

A multi-use molding strip for trimming comprising a pair of stock pieces, each of indeterminate length, and a flexible elastic decorative laminate joining the stock pieces together. Each stock piece includes inner walls facing each other diverging away from the elastic laminate so that the stock pieces may be rotated about a longitudinal axis defined by the junction of the laminate with the inner walls to accommodate a surface being trimmed. The strip may serve as a baseboard, ceiling corner trim, doorway molding, or as a wainscoting cap, to name a few uses.

BACKGROUND OF THE INVENTION

The instant invention solves a long felt need in the building and construction industry by providing a universally adaptable molding strip for trim purposes which is aesthetically pleasing yet completely functional in a wide variety of applications. The invention is particularly useful as a finishing touch in construction, in that corners, wall edges, baseboard areas, wainscoting terminal edges, and doorways are difficult to finish to a neat, clean and professional appearance. This invention provides a single structure which may easily be applied for all these purposes.

The prior art is not bereft of proposed solutions. Commonly, elongate strips of wood or other material are nailed or otherwise fastened in place to cover the areas mentioned. But to yield a pleasing, aesthetic finish, the wood used must be fine grained as well as of substantial dimensions, in order to cover the area adequately. These two requirements increase costs substantially. Furthermore, the undersurface of the strip must occasionally be undercut to match the area being trimmed, particularly when used to cap wainscoting. Finally, such a strip is rarely universally applicable as trim.

Since wood of decorative quality is increasingly, even prohibitively expensive, a laminated product formed with a plywood or composition board substrate and covered with a plastic material such as vinyl has become popular as a substitute for common paneling and window frames. The problems encountered in bending large sheets of such material to fit corners have been discussed in U.S. Patent Nos. 2,168,234, issued to Rudolf F. Onsrud; 3,322,171, issued to Richard R. Cornell; and 3,456,701, also issued to Richard R. Cornell wherein machines for grooving the substrate so that a panel may be bent about the groove are disclosed. U.S. Patent No. 3,420,142, issued to Leo R. Gale et al., also shows such a machine as well as a use for the product formed. The product is a laminated heating duct, having a fiberboard substrate with an elastic surface.

Two prior patents are relevant as showing laminated material used decoratively. U.S. Patent No. 3,340,665, issued to John O. Kohl illustrates a window frame covered by an elastic shell. Of course, no bending of the material disclosed is required or discussed. U.S. Patent No. 3,277,624, issued to Richard R. Cornell is more relevant, indicating a beamed ceiling construction formed from laminated, grooved panel members. The aesthetic requirements of the surface laminate are fully discussed.

The present invention represents another step in the development of the art discussed by presenting an aesthetically pleasing molding trim strip useful in a wide variety of trim applications.

SUMMARY OF THE INVENTION

The invention claimed is a multi-use molding strip of indeterminate length, comprising two stock pieces having an elastic laminate for joining the pieces, the pieces having facing side walls, diverging away from the laminate surface so that the pieces may be bent along a longitudinal axis formed by the junction of the laminate and pieces to accommodate the surface being trimmed. Usually, the cross-sectional dimensions of one stock piece will vary from the other to permit universality of application. Each stock piece may be slightly bevelled at the longitudinal axis to prevent possible rupture of the laminate as it is bent.

BRIEF DESCRIPTION OF THE DRAWINGS

Further and more complete objects and advantages of the invention will become readily apparent by reference to the following specification and drawings, wherein:

FIG. 1 is an elevational schematic drawing illustrating a process employed in manufacturing the invention;

FIGS. 2, 3 and 4 are cross-sectional views of the invention showing progressive stages of manufacture;

FIGS. 5, 6, 7, and 8 are fragmentary, cross-sectional views of the invention being used as a wainscoting cap, baseboard, ceiling trim, and doorway trim, respectively;

FIGS. 12, 14 and 16 indicate the invention used as a wainscoting cap, casing trim, and baseboard or ceiling trim, in perspective, respectively, while FIGS. 13, 15 and 17 show the proper methods of mitering the invention for the applications illustrated by FIGS. 11, 13 and 15, respectively.

DESCRIPTION OF THE PREFERRED EMBODIMENTS

Figure 9:
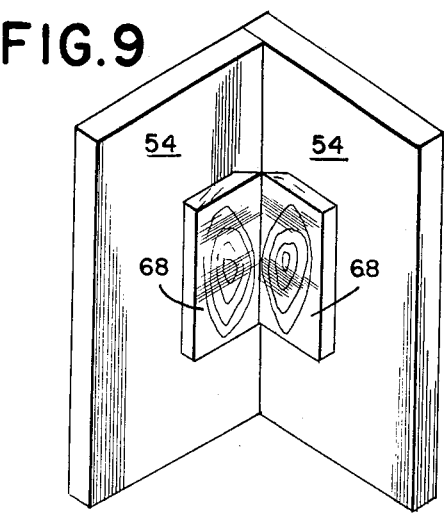
FIGS. 9, 10 and 11 illustrate, in perspective, the invention used as inside corner trim, outside corner trim, and as a batten, respectively.

Referring now to the drawings by reference character; FIG. 1 illustrates a basic process of manufacturing the invention wherein a single stock piece 10, which has previously been ripped to approximate the desired finished dimensions and, in the preferred embodiment, is made of plywood. A pair of top feed rolls 12 and bottom feed rolls 14 feed material to a finishing station, generally indicated at 16. Rolls 12 and 14 may be single or multiple and finishing station 16 may include a plurality of cutters for forming the finished piece. For example, edges 18 and 20 may be rounded to prevent rupture of the later applied vinyl overlay or laminate 22, groove 24 may be cut in top surface 26 for reasons explained below, and edges 28 and 30 may be shaped as shown in FIGS. 2, 3 and 4. Edges 28 and 30 are formed on functional, cross-sectional angles so that the invention is adapted for the universal applications illustrated in FIGS. 5 through 8.

Stock piece 10 then passes beneath applicator 32, which may include rolls 34 and 36 for applying the vinyl laminate 22, glue having been applied thereto prior to pressing into place by roll or rolls 36. In the preferred embodiment, material 22 is made of vinyl film, but it may be any one of a wide variety of elastic or elastomeric materials, and usually will have a top surface finished to a pleasing, aesthetic finish, such as wood grain. On the other hand, the very top surface of material 22 may be clear, with a decorative surface immediately therebeneath. At any rate, the exact type and finish of material 22 to be used forms no part of the invention, save for the fact of its general elastic properties.

At any rate, stock piece 10 then proceeds to lengthwise cutter 38 which machines piece 10 into two stock pieces 48 and 50, having facing inner walls 44 and 46, respectively. The finished product, illustrated in FIG. 4, is now ready for application as trim molding. Generally, it now comprises two stock pieces 48 and 50, of indeterminate length, having inner side faces 44 and 46, which diverge downwardly and outwardly from groove 24. Stock piece 48 has an outer side wall of bull nose configuration, including edges 20, 28 and 30 while piece 50 also has a rounded, outside wall, to the right in FIG. 4. The base surface 40 of piece 48 and 42 of piece 50 may be formed prior to finishing station 16 or thereby. The planar surfaces 40 and 42 are usually coextensive, paralleling the length of pieces 48 and 50, but not parallel to planar surface 26, now bifurcated by groove 24. This configuration is functional, to meet the requirements of applying the invention, shown in FIGS. 5 through 8.

The reason for groove 24 is dual in nature. Groove 24 now forms a longitudinal axis of rotation for stock pieces 48 and 50, in that laminate 22 serves as the only connection for pieces 48 and 50 once walls 44 and 46 have been cut. Groove 24 prevents rupture of laminate 22 during bending of pieces 48 and 50, to accommodate the surface to which they will be applied, and prevents rupture of the laminate by cutter 38, in that this cutter need only come to the base of groove 24 in order to neatly cleave stock piece 10 in two, rather than to a position directly beneath laminate 22, as shown in the prior art discussed previously.

It should be clearly understood that the groove 24 is cut before the laminate is applied to the elongate strip. This permits the strip to be folded along its long axis to present a more-or-less rounded edge at the groove instead of a sharp one. This is more acceptable aesthetically and protects the laminate.

The various faces cut into stock piece 10 need not be perfectly planar as shown. For example, if it is known that the material forming stock piece 10 will bush or bloom as pieces 48 and 50 are bent toward each other faces 44 and 46 should be cut concavely to compensate. U.S. Patent No. 2,505,789, issued to Glenn H. Norquist, discloses the problem and a convex headed cutter as a solution. The remaining faces of pieces 48 and 50 may be flat as shown or even slightly convex.

Referring now to FIGS. 5, 6, 7 and 8, various applications of the invention are shown by way of example. FIG. 5 illustrates application of the invention as a wainscoting cap, in cross-section. Stock pieces 48 and 50 are bent toward each other, about axis or groove 24 whereupon the invention is secured to wainscoting 52 and, wall 54 by a number of nails 56. In FIG. 6, the invention is used as baseboard material; pieces 48 and 50 are bent apart about axis 24 and secured in place by nails 56, to a wall 54 and into a shim 58. The invention used as ceiling corner molding is illustrated in FIG. 7. The invention is secured as in FIG. 6, to wall 54 and shim piece 60; the ceiling is denominated 62. In FIG. 8, a pair of strips are used, wherein each is left in the attitude depicted in FIG. 4, and the invention serves as door trim, being secured by nails 56 to door jamb 64 and walls 54, 54. Numeral 66 represents the vertical stud of the doorway.

Figure 10:
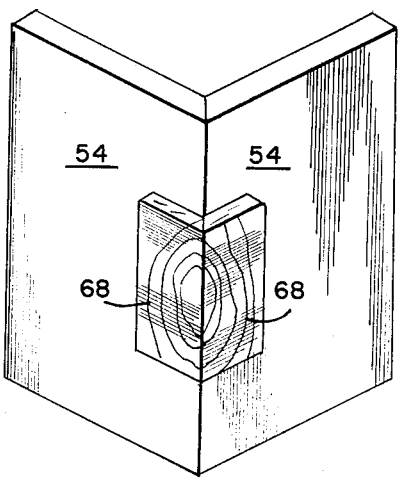
Figure 11:
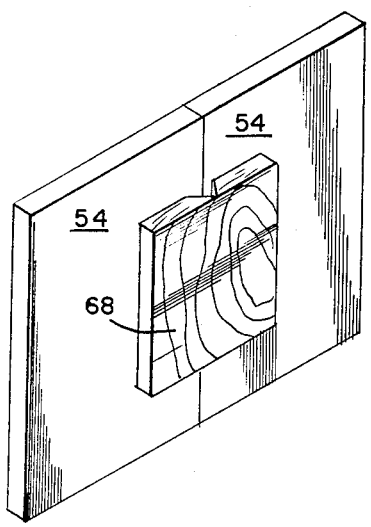

In the applications illustrated, the angle formed by faces 44 and 46 is approximately 60°, when the invention is disposed as illustrated in FIG. 4. This angle of divergence formed by faces 44 and 46 affords a trim piece strong and versatile enough to serve the uses shown. However, the invention may also be used to cap a 90° corner. In this case, the angle formed by faces 44 and 46 should be increased to 90° as shown in FIGS. 9 to 11. Additionally, it may be desirable to have symmetrical halves in the invention. If so, the cutters 16 will be arranged to form two pieces 48, 48 or two pieces 50, 50 rather than the dissimilar stock pieces 48, 50 illustrated in the drawings.

Figure 12:
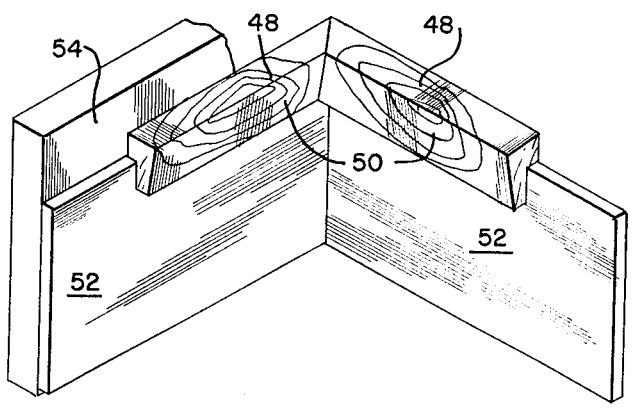

FIGS. 9, 10 and 11 illustrate the invention formed as two symmetrical pieces 68, 68, and employed on an inside corner, outside corner, and as a batten, at the junction of two panels, respectively. FIGS. 12, 14 and 16 are fragmentary perspective views depicting the invention as a wainscoting cap, doorway trim, and baseboard, respectively, at corner junctions. A common miter box 70 is used to properly miter corner junctions of the invention, as shown by FIG. 13 (wainscoting cap), FIG. 15 (doorway trim) and FIG. 17 (baseboard). In FIGS. 13 and 17, members 72 and 74, approximating the width and heighth dimensions of shim 58 (FIG. 6) and shim piece 60 (FIG. 7) serve to support the invention in an attitude similar to its final installed position for exact mitering.

We claim:

1. A multi-use molding strip for trimming, of indeterminate length, comprising:
    (a) first and second elongate stock pieces, each including:
        (1) means defining a first generally planar surface;
        (2) means defining a second generally planar surface;
        (3) means defining an inner, lateral side face; and
        (4) means defining an outer, lateral side face; and
    (b) flexible means for joining said first and second stock pieces together along a longitudinal axis defined by the junction of said first planar surfaces and said inner side faces;
    said inner side faces diverging from said longitudinal axis toward said second planar surfaces, whereby said stock pieces may each be rotated about said longitudinal axis to accommodate a surface being trimmed prior to permanent installation of said molding strip and wherein said first planar surfaces define a generally coterminous upper plane, and said second planar surfaces define a generally coterminous lower plane, said upper and lower planes being parallel to the length of said molding strip, but not parallel to each other.

2. The invention as recited in claim 1 wherein the outer face of said first stock piece comprises two lateral side edges, diverging outwardly from said longitudinal axis, and meeting on a line approximately midway between said first and second planar surfaces of said first stock piece.

3. A multi-use molding strip for trimming, of indeterminate length, comprising:
    (a) first and second elongate stock pieces, each including:
        (1) means defining a first generally planar surface;
        (2) means defining a second generally planar surface;
        (3) means defining an inner, lateral side face; and
        (4) means defining an outer, lateral side face; and
    (b) flexible means for joining said first and second stock pieces together along a longitudinal axis defined by the junction of said first planar surfaces and said inner side faces;
    said inner side faces diverging from said longitudinal axis toward said second planar surfaces, whereby said stock pieces may each be rotated about said longitudinal axis to accommodate a surface being trimmed prior to permanent installation of said molding strip and wherein a first line defined by the junction of the face and first planar surface of said first stock piece, and a second line defined by the junction of the inner face and first planar surface of said second stock piece are slightly bevelled, along a line coterminous with said longitudinal axis, to prevent rupture of said flexible means upon rotation of the stock pieces about said longitudinal axis.

4. The invention as recited in claim 3 wherein the angle of divergence between said inner faces is approximately 60°.

5. The invention as recited in claim 3 wherein the angle of divergence between said inner faces is approximately 90°.

References Cited

UNITED STATES PATENTS

| | | | |
|---|---|---|---|
| 2,505,789 | 5/1950 | Norquist | 52—631 |
| 3,216,875 | 11/1965 | Wenthe | 52—716 X |
| 3,365,854 | 1/1968 | Gallo | 52—716 |
| 3,408,250 | 10/1968 | Finefrock | 52—716 X |
| 2,149,882 | 3/1939 | Clements | 52—631 X |
| 2,867,864 | 1/1959 | Githens | 161—44 X |
| 3,277,624 | 10/1966 | Cornell | 52—484 |
| 3,420,142 | 1/1969 | Gale et al. | 144—136 X |
| 3,496,689 | 2/1970 | Nerem | 52—631 X |

ROBERT F. BURNETT, Primary Examiner

J. C. GIL, Assistant Examiner

U.S. Cl. X.R.

52—631, 716; 144—136, 315